(12) United States Patent
Kirkpatrick

(10) Patent No.: US 12,304,869 B2
(45) Date of Patent: *May 20, 2025

(54) COMPOSITES AND METHODS OF FORMING COMPOSITES HAVING AN INCREASED VOLUME OF OXIDATION RESISTANT CERAMIC PARTICLES

(71) Applicant: GOODRICH CORPORATION, Charlotte, NC (US)

(72) Inventor: Christopher T. Kirkpatrick, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 238 days.

This patent is subject to a terminal disclaimer.

(21) Appl. No.: 17/824,817

(22) Filed: May 25, 2022

(65) Prior Publication Data

US 2023/0382810 A1 Nov. 30, 2023

(51) Int. Cl.
*C04B 35/80* (2006.01)
*C04B 35/626* (2006.01)
(Continued)

(52) U.S. Cl.
CPC .......... *C04B 35/80* (2013.01); *C04B 35/6269* (2013.01); *C04B 35/62863* (2013.01);
(Continued)

(58) Field of Classification Search
CPC ............ B32B 18/00; C04B 2235/3813; C04B 2235/3826; C04B 2235/3873;
(Continued)

(56) References Cited

U.S. PATENT DOCUMENTS 4,613,522 A * 9/1986 Vasilos .................. B32B 5/30
427/205
5,759,688 A 6/1998 Lee et al.
(Continued)

FOREIGN PATENT DOCUMENTS

CN 109111239 A * 1/2019 ........... C04B 35/622
CN 109721377 A * 5/2019
(Continued)

OTHER PUBLICATIONS

European Patent Office, European Search Report dated Oct. 9, 2023 in Application No. 23175255.1.

*Primary Examiner* — David P Turocy
(74) *Attorney, Agent, or Firm* — SNELL & WILMER L.L.P.

(57) ABSTRACT

A fiber reinforced composite component may include interleaved textile layers and ceramic particle layers coated with matrix material. The fiber reinforced composite component may be fabricated by forming a fibrous preform and densifying the fibrous preform. The fibrous preform may be fabricated by performing a silicon melt infiltration after the densification process. A plurality of pores defined by the carbon matrix material are infiltrated with a silicon material and the fibrous preform is heated to a melt temperature until a desired percentage (e.g., at least 50%) of the carbon matrix material is converted into silicon carbide or another oxidation resistant material.

14 Claims, 9 Drawing Sheets

(51) Int. Cl.
*C04B 35/628* (2006.01)
*C04B 35/634* (2006.01)
*C04B 35/657* (2006.01)

(52) U.S. Cl.
CPC .. *C04B 35/62871* (2013.01); *C04B 35/62873* (2013.01); *C04B 35/62878* (2013.01); *C04B 35/62892* (2013.01); *C04B 35/63476* (2013.01); *C04B 35/657* (2013.01); *C04B 2235/3813* (2013.01); *C04B 2235/3826* (2013.01); *C04B 2235/3873* (2013.01); *C04B 2235/5248* (2013.01); *C04B 2235/5256* (2013.01); *C04B 2235/604* (2013.01); *C04B 2235/616* (2013.01)

(58) Field of Classification Search
CPC .......... C04B 2235/428; C04B 2235/48; C04B 2235/5248; C04B 2235/5256; C04B 2235/5427; C04B 2235/5436; C04B 2235/604; C04B 2235/614; C04B 2235/616; C04B 2235/721; C04B 2235/728; C04B 2235/77; C04B 2235/9684; C04B 2237/365; C04B 2237/38; C04B 35/565; C04B 35/573; C04B 35/6269; C04B 35/62863; C04B 35/62871; C04B 35/62873; C04B 35/62878; C04B 35/62892; C04B 35/6316; C04B 35/63476; C04B 35/657; C04B 35/80; C04B 35/83; F02G 1/043
See application file for complete search history.

(56) References Cited

U.S. PATENT DOCUMENTS

| | | | |
|---|---|---|---|
| 6,221,475 B1 | 4/2001 | Domergue | |
| 7,364,794 B2 | 4/2008 | Ohnishi et al. | |
| 10,450,236 B2 * | 10/2019 | Kirkpatrick | ........... C23C 16/045 |
| 2005/0142346 A1 * | 6/2005 | Ohnishi | ........... C04B 35/62625 |
| | | | 501/87 |
| 2005/0153137 A1 * | 7/2005 | Thompson | .............. C04B 35/83 |
| | | | 428/408 |
| 2013/0167374 A1 * | 7/2013 | Kirby | .................... H04W 4/023 |
| | | | 428/317.9 |
| 2017/0313629 A1 * | 11/2017 | Shim | ..................... C04B 35/584 |
| 2019/0225552 A1 * | 7/2019 | Taggart | .................. B32B 18/00 |
| 2021/0101842 A1 * | 4/2021 | LeCostaouec | ...... C04B 41/5059 |
| 2022/0388913 A1 * | 12/2022 | Read | .................. C04B 35/6342 |
| 2023/0192561 A1 * | 6/2023 | Read | ...................... F01D 5/284 |
| | | | 428/325 |

FOREIGN PATENT DOCUMENTS

| | | | | |
|---|---|---|---|---|
| EP | 1008569 | | 10/2009 | |
| EP | 2657207 A1 * | | 10/2013 | ............ B05D 3/107 |
| EP | 3925942 | | 12/2021 | |
| WO | WO-2017140986 A1 * | | 8/2017 | ........... C04B 35/565 |

\* cited by examiner

COMPOSITES AND METHODS OF FORMING COMPOSITES HAVING AN INCREASED VOLUME OF OXIDATION RESISTANT CERAMIC PARTICLES

FIELD

The present disclosure relates to composites, and more specifically, to composites having ceramic particles and methods of forming the same.

BACKGROUND

Composite bodies are utilized in various industries, including the aerospace industry. Composite bodies for aerospace applications can be exposed to harsh environments and may be expected to exhibit elevated heat capacities in order to absorb and dissipate heat.

SUMMARY

Disclosed herein is a method of fabricating a composite component. In accordance with various embodiments, the method comprises forming a fibrous preform by forming a first ceramic particle layer over a first textile layer, disposing a second textile layer over the first ceramic particle layer, forming a second ceramic particle layer over the second textile layer, and disposing a third textile layer over the second ceramic particle layer. The method further comprises performing a densification process on the fibrous preform, the densification process includes coating a plurality of fibers of the fibrous preform with a carbon matrix material. The method further comprises performing a silicon melt infiltration process after the densification process. The silicon melt infiltration process includes infiltrating a plurality of pores defined by the carbon matrix material with a silicon material, and heating the fibrous preform to a melt temperature until at least 50% of the carbon matrix material and at least a portion of the silicon material is converted into silicon carbide.

In various embodiments, the densification process further includes applying a compressive load to the fibrous preform.

In various embodiments, the first ceramic particle layer comprises at least one of silicon carbide (SiC) particles, silicon nitride ($Si_3N_4$) particles, or zirconium diboride ($ZrB_2$) particles.

In various embodiments, wherein the plurality of fibers are carbon fibers.

In various embodiments, forming the first ceramic particle layer comprises depositing a first volume of silicon carbide powder over the first textile layer, and wherein forming the second ceramic particle layer comprises depositing a second volume of silicon carbide powder over the second textile layer.

In various embodiments, forming the fibrous preform further comprises locating a first shim around an outer perimeter of the first textile layer, and locating a second shim around an outer perimeter of the second textile layer.

In various embodiments, forming the fibrous preform further comprises removing a portion of the first volume of silicon carbide powder extending beyond an upper surface of the first shim, and removing a portion of the second volume of silicon carbide powder extending beyond an upper surface of the second shim.

In various embodiments, forming the fibrous preform further comprises disposing the first textile layer on a first plate, and disposing a second plate over the third textile layer. At least one of the first plate or the second plate includes at least one of a groove or an orifice.

A method of forming a fibrous preform for fabricating a composite component is disclosed. In accordance with various embodiments, the method comprises forming a first ceramic particle layer over a first textile layer, disposing a second textile layer over the first ceramic particle layer, forming a second ceramic particle layer over the second textile layer, disposing a third textile layer over the second ceramic particle layer, coating at least one of the first ceramic particle layer, the first textile layer, the second textile layer, the second ceramic particle layer, or the third textile layer with a carbon matrix material, infiltrating a plurality of pores defined by the carbon matrix material with a silicon material, and heating the composite component to a melt temperature until at least 50% of the carbon matrix material and at least a portion of the silicon material is converted into a silicon carbide.

In various embodiments, the composite component is heated to the melt temperature until at least 75% of the carbon matrix material is converted into the silicon carbide.

In various embodiments, forming the first ceramic particle layer comprises depositing a first volume of silicon carbide powder over the first textile layer, and wherein forming the second ceramic particle layer comprises depositing a second volume of silicon carbide powder over the second textile layer.

In various embodiments, the method further comprises disposing the first textile layer on a mold surface, forming the first ceramic particle layer by depositing a mixture of silicon carbide powder and phenolic resin powder over the first textile layer, and curing the phenolic resin powder.

In various embodiments, at least one of the first textile layer, the second textile layer, or the third textile layer comprises stretch-broken carbon fibers.

In various embodiments, a number of moles of the silicon material selected to be between 75% and 100% of a number of moles of the carbon matrix material.

In various embodiments, the melt temperature is between 1410° C. (2570° F.) and 1500° C. (2732° F.).

A fiber reinforced composite component is disclosed. In accordance with various embodiments the fiber reinforced composite component comprises a first textile layer comprising a plurality of first carbon fibers, a second textile layer comprising a plurality of second carbon fibers, a layer of ceramic particles located between the first textile layer and the second textile layer, a carbon matrix material encapsulating the plurality of first carbon fibers, the plurality of second carbon fibers, and the layer of ceramic particles, wherein the carbon matrix material defines a plurality of pores, and a silicon carbide material located in the plurality of pores.

In various embodiments, the layer of ceramic particles comprises silicon carbide.

In various embodiments, the silicon carbide material occupies between 75% and 100% of a volume of the plurality of pores, and the carbon matrix material occupies between 0% and 25% of the volume of the plurality of pores.

In various embodiments, the layer of ceramic particles comprise a plurality of ceramic particles having a grit size of between 100 grit and 500 grit.

In various embodiments, the silicon carbide material encapsulates the carbon matrix material.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
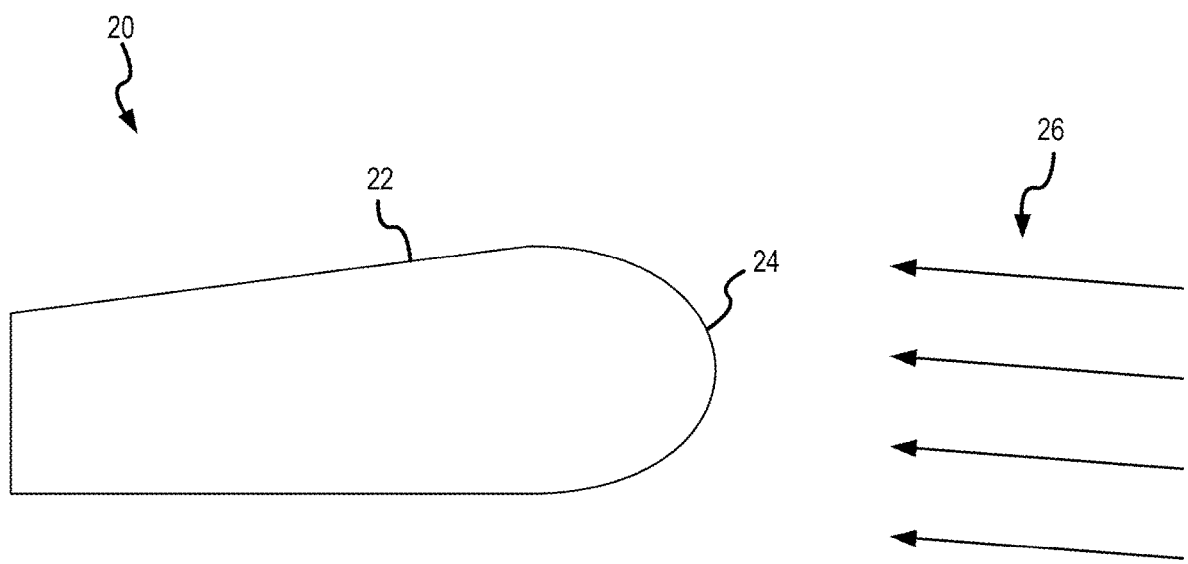
FIG. 1 illustrates an aerospace structure have a fiber-reinforced ceramic matrix composite (CMC) component, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Provided herein, according to various embodiments, are fiber reinforced composite parts and method(s) for fabricating fiber reinforced composite parts, such as leading edge aerodynamic structures (or other aerodynamic structures exposed to elevated temperatures), having ceramic particle layers interspersed between textile layers. While numerous details are included herein pertaining to aircraft components, such as leading edge components, the components and method(s) disclosed herein can be applied to fabricate other carbon fiber-reinforced/carbon matrix composite (C/C) components that benefit from better thermal performance and increased oxidation resistance.

With reference to FIG. 1, an aerodynamic structure 20 is schematically illustrated, in accordance with various embodiments. Aerodynamic structure 20 may include a body 22 comprising a leading edge 24 which collides with incoming air flow 26. Air flow 26 may comprise a hot gas which impinges on the leading edge 24 after being rapidly compressed and heated, for example as a result of a bow shock in front of the aerodynamic structure 20. In this regard, leading edge 24 may be heated by atmospheric friction to an elevated temperature.

To protect the aerodynamic structure 20 from overheating, the leading edge 24 (and/or other components of the aerodynamic structure 20 as desired) may be fabricated from composite materials, such as, for example, fiber-reinforced ceramic matrix composites (CMC), that enable the aerodynamic structure 20 to withstand and dissipate the heat generated during and following a maneuvering action. Moreover, a fiber-reinforced CMC material of the present disclosure may be manufactured to maximize the presence of Silicon Carbide (SiC), or other oxidation resistant ceramic particles, to enhance oxidation resistance. In this regard, fiber-reinforced CMC parts of the present disclosure may be especially useful in these applications because of the superior high temperature and high oxidation resistance characteristics of the fiber-reinforced CMC material.

In accordance with various embodiments, the leading edge 24 is comprised of a fiber-reinforced CMC material having high oxidation resistance particles interspersed throughout the part, where high oxidation resistance particles includes any particle or powder (typically ceramic) that raises the oxidation resistance of the part above that of C/C alone. For example, in various embodiments, the part may comprise a CMC that includes a percentage of silicon, silicon carbide (SiC), silicon nitride ($Si_3N_4$), Zirconium Diboride ($ZrB_2$), or other material having a high oxidation resistance (i.e., an oxidation resistance greater than the oxidation resistance of the C/C alone).

As described in further detail below, the process of interspersing the silicon carbide (or other high oxidation resistance particles) into the CMC is performed by depositing a silicon carbide powder between one or more textile layers of the fibrous preform used to form the part. After forming the fibrous preform, including one or more layers of silicon carbide particles, the fibrous preform is densified using chemical vapor infiltration (CVI) and/or chemical vapor deposition (CVD). During densification, a matrix material (e.g., a carbon matrix) is deposited on and encapsulates the silicon carbide particles and the fibers of the textile layers. In various embodiments, after densification, a silicon melt infiltration is performed to form a silicon layer over the carbon matrix. Depositing silicon carbide powder between the textile layers may allow greater volumes of silicon carbide to be included in the composite part. Increasing the volume of silicon carbide may decrease a porosity and/or increase a density of the final composite component. Further, greater volumes of silicon carbide particles may reduce the volume of the carbon matrix material in the final composite component and/or may increase the oxidation resistance of the final composite component.

Figure 2:
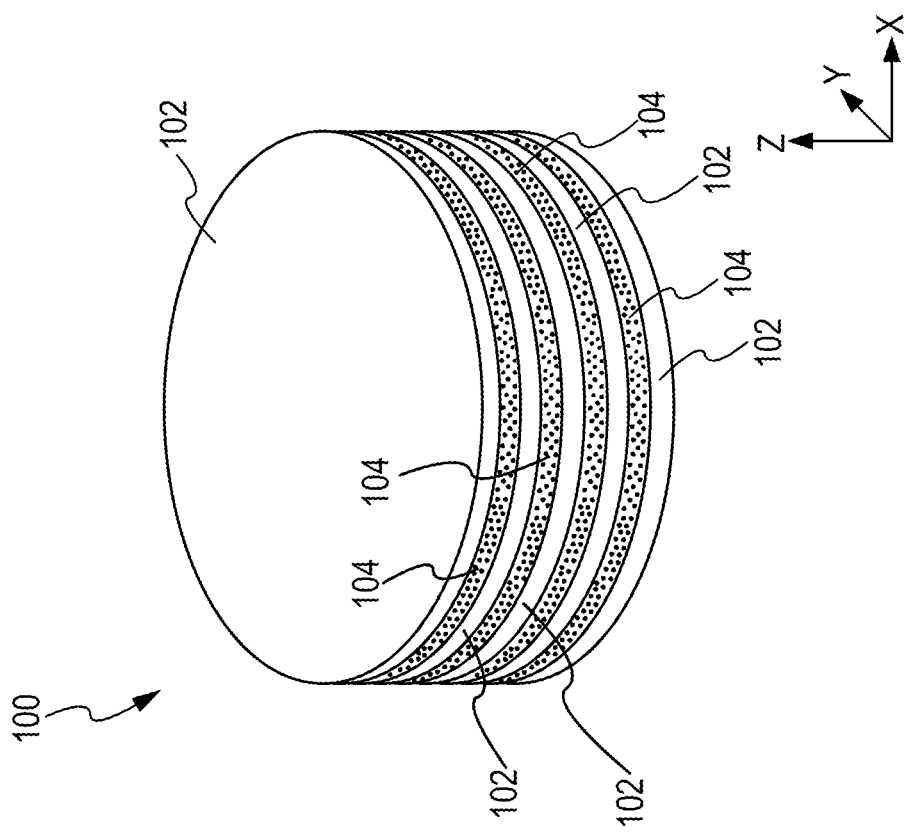
FIG. 2 illustrates a fibrous preform including ceramic particle layers interspersed between textile layers, in accordance with various embodiments.

Referring now to FIG. 2, a fibrous preform 100 is illustrated, in accordance with various embodiments. Fibrous preform 100 may be employed to form a leading edge surface or other aerospace component, as described above. Although illustrated as comprising a round shape, it is contemplated and understood that fibrous preform 100 may comprise any desired shape, such as square, rectangular, polygonal, ovular, or any other shape as desired. Fibrous preform 100 may comprise a plurality of stacked textile layers 102. Each textile layer 102 has a first dimension in the thickness direction (e.g., as measured along the direction of the Z-axis) that may be substantially less than the dimensions of the textile layer 102 in the lateral and transverse directions (e.g., as measured along directions of the X-axis and Y-axis, respectively).

In accordance with various embodiments, textile layers 102 comprises woven, braided, or knitted carbon fibers. In various embodiments, one or more of the textile layers 102 may comprise silicon carbide fibers or boron fibers. In various embodiments, one or more of the textile layers 102 may comprise carbon fibers in an open weave pattern (i.e., a weave wherein there is increased distance between the warp tows and between the weft tows). In various embodiments, one or more of the textile layers 102 may comprise stretch-broken carbon fibers. Stretch-broken fibers are generally made by stretching a fiber bundle until the individual fibers break or fracture into multiple fragments. Stretch-broken fibers may a form of aligned discontinuous fiber. Stretch-broken fibers provide flexibility to form complex shapes while maintaining comparable strength and stiffness to that of continuous fibers. Employing stretch-broken fibers tends to increase the bonding or securing of the matrix material during CVI/CVD within the textile layers of the fibrous preform. Employing stretch-broken carbon fibers tends to increase the bonding or securing of the ceramic particles (e.g., SiC) within the textile layer and the composite part. In various embodiments, the carbon fibers may be derived from polyacrylonitrile (PAN), rayon (synthetic fiber derived from cellulose), oxidized polyacrylonitrile fiber (OPF), carbon pitch, or the like. The starting fiber may be pre-oxidized PAN or fully carbonized commercial carbon fiber. The textile layers 102 may be formed or cut having any desired shape or form. For example, although illustrated as having a round shape, it is contemplated and understood that the textile layers 102 may have any desired shape such as, for example, a polygon, circular, triangular, square, rectangular, pentagonal, hexagonal, octagonal, among others. In various embodiments, textile layers 102 and fibrous preform 100 may have a generally planar geometry or a non-planar geometry (e.g., a complex 3D shape).

Fibrous preform 100 is a lay-up of textile layers 102. In accordance with various embodiments, fibrous preform 100 includes one or more ceramic particle layers 104. Each ceramic particle layer 104 is located between a pair of adjacent textile layers 102. In various embodiments, ceramic particle layers 104 may be comprised of silicon carbide particles. A range of particle sizes (or powder sizes) may be employed in the ceramic powders used to fabricate the ceramic particle layers 104. For example, in various embodiments, a silicon carbide powder between 100 grit and 500 grit may be selected for ceramic particle layers 104. In various embodiments, a silicon carbide powder between 200 grit and 500 grit may be selected for ceramic particle layers 104. In various embodiments, a silicon carbide powder between 250 grit and 450 grit may be selected for ceramic particle layers 104. In various embodiments, a silicon carbide powder between 400 grit and 500 grit may be selected for ceramic particle layers 104. Stated differently, the silicon carbide particles may have an average particle size between about 35 micrometers (µall) and about 163 µm, between about 35 µm and about 85 µm, between about 39 µm and about 68 µm, and/or between about 35 µm and about 44 µm (i.e., between about 0.00137 inches and about 0.0064 inches, between about 0.00137 inches and about 0.0033 inches, between about 0.0015 inches and about 0.00267 inches, and/or between about 0.00137 inches and about 0.0017 inches). As used in the previous context only, the term "about" means plus or minus ten percent of the associated value.

Figure 3:
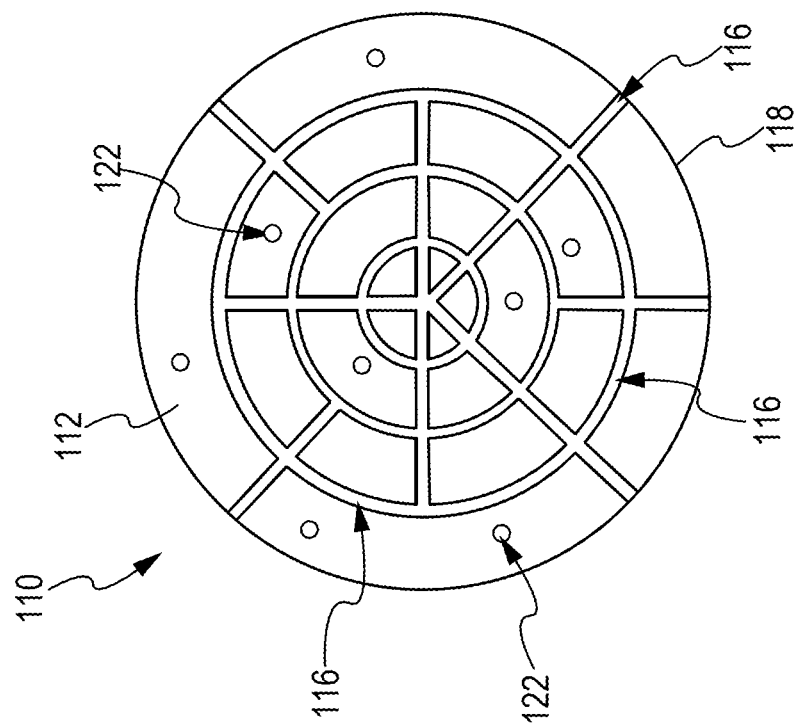
FIG. 3 illustrates a plate for facilitating formation and densification of a fibrous preform having ceramic particle layers interspersed between textile layers, in accordance with various embodiments.
Figure 4A:
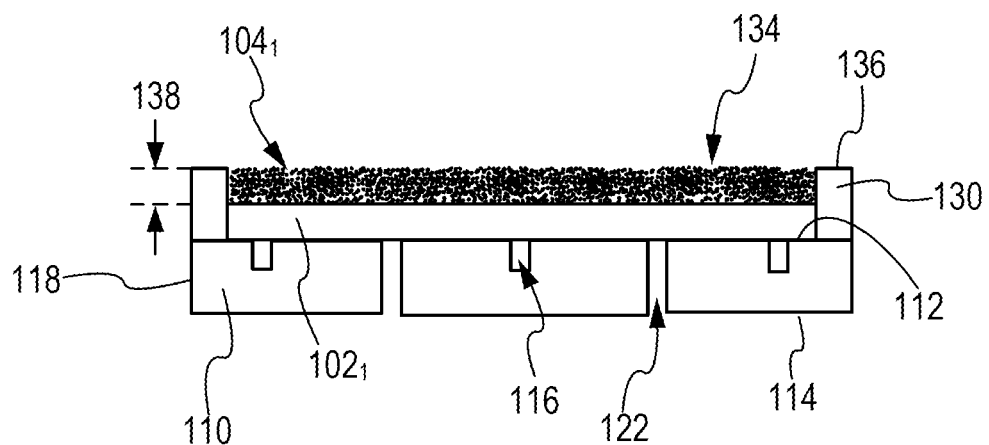
FIG. 4A, FIG. 4B, and FIG. 4C illustrate formation of a fibrous preform including ceramic particle layers, in accordance with various embodiments.
Figure 4B:
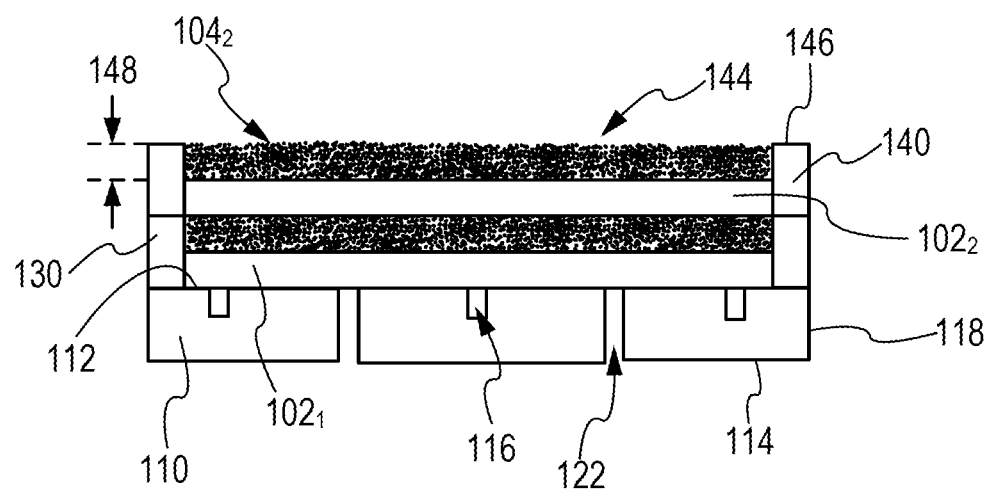
Figure 4C:
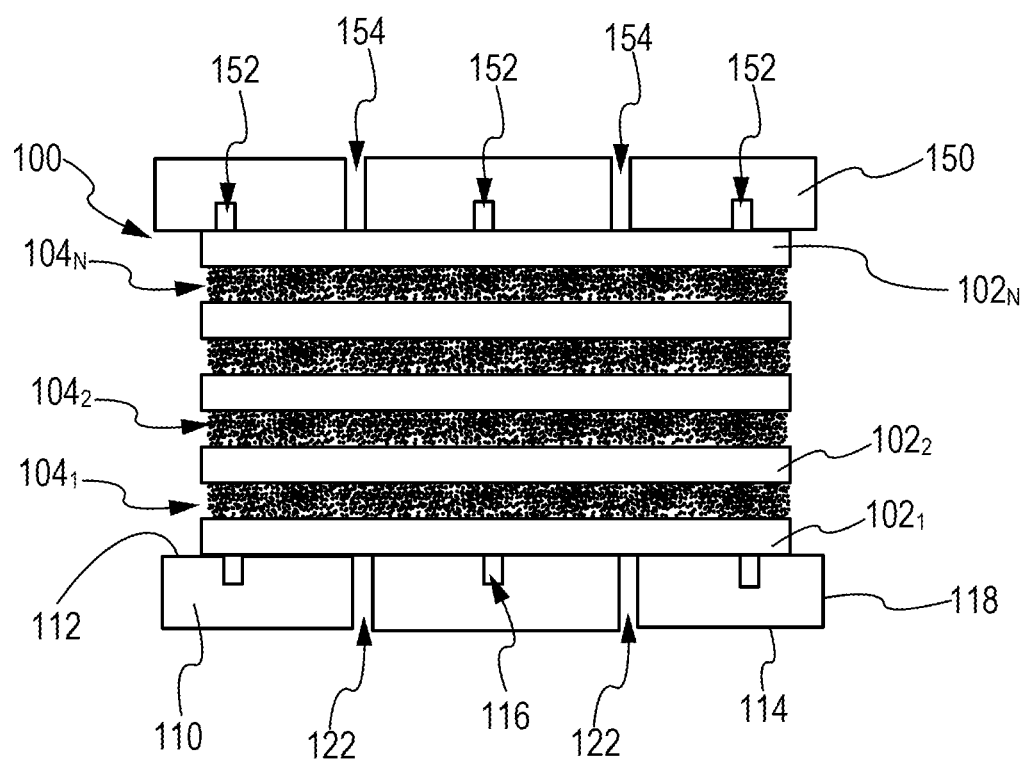

With reference to FIG. 4A, FIG. 4B, and FIG. 4C, formation of fibrous preform 100 is illustrated, in accordance with various embodiments. In FIG. 4A, a first textile layer 1021 is located on a plate 110. FIG. 3 illustrates plate 110. With combined reference to FIG. 3 and FIG. 4A, plate 110 includes opposing surfaces 112 and 114. First textile layer 1021 may be located on surface 112 of plate 110. A plurality of grooves, or channels, 116 may be formed into surface 112. Stated differently, surface 112 of plate 110 may define grooves 116. Grooves 116 may extend from a perimetrical surface 118. Grooves 116 may extend from perimetrical surface 118 toward a center of plate 110. In various embodiments, plate may include one or more orifices 122 extending from surface 112 to surface 114. Grooves 116 and orifices 122 tend to facilitate the flow gas to and infiltration of the fibrous preform during densification. Grooves 116 and orifices 122 may be formed in any desired pattern. While plate 110 is illustrated as having a circular shape, it is contemplated and understood that plate 110 may have any desired shape. In various embodiments, the shape of plate 110 matches the shape of textile layers 102.

With continued reference to FIG. 4A, a first shim, or spacer, 130 is located around an outer perimeter (or outer circumference) 132 of first textile layer 1021. For textile layers having an annular shape, a shim is also located along the inner perimeter (or inner circumference). With first shim 130 in place, silicon carbide powder 134 is deposited (e.g., poured) over first textile layer 1021. The silicon carbide powder 134 is deposited until, at least, an upper surface 136 of first shim 130 is reached (i.e., until the volume defined by first shim 130 and first textile layer 1021 is filled, or substantially filled, with silicon carbide powder 134). In various embodiments, a scrapper or leveler may be translated (i.e., slid) over silicon carbide powder 134 and first shim 130 to remove any portion of silicon carbide powder 134 which may be extending beyond upper surface 136 of first shim 130. In this regard, after scraping, the silicon carbide powder 134 forms a first ceramic particle layer 1041 having a thickness 138.

With reference to FIG. 4B, a second textile layer 1022 is located over first ceramic particle layer 1041. A second shim 140 is located over first shim 130 and around the outer perimeter of second textile layer 1022. For textile layers having an annular shape, a shim is also located along the inner perimeter (or inner circumference). With second shim 140 in place, silicon carbide powder 144 is deposited (e.g., poured) over second textile layer 1022. The silicon carbide powder 144 deposited until at least an upper surface 146 of second shim 140 is reached (i.e., until the volume defined by second shim 140 and second textile layer 1022 is filled, or substantially filled, with silicon carbide powder 144). In various embodiments, a scrapper or leveler may be translated or slid over silicon carbide powder 144 and second shim 140 to remove any portion of silicon carbide powder 144 which may be extending beyond upper surface 146 of second shim 140. In this regard, after scraping, the silicon carbide powder 144 forms a second ceramic particle layer 1042 having a thickness 148. Thickness 148 may be equal to thickness 138 (FIG. 4A).

With reference to FIG. 4C, once the desired number of textile layers 102 and ceramic particle layers 104 have been formed (i.e., stacked), the shims may be removed and a plate 150 is located over the final textile layer 102N. In this regard, plate 110 and plate 150 are located over opposing ends of fibrous preform 100. Plate 150 may include grooves 152 and/or orifices 154, similar to grooves 116 and orifices 122 in plate 110.

In accordance with various embodiments, a compressive load may be applied to fibrous preform 100. For example, in response to removing the shims, the weight of plate 150 may compress fibrous preform 100 between plate 110 and plate 150. In various embodiments, a compressive load may be applied to plate 150 to compress fibrous preform 100 between plate 110 and plate 150. In various embodiments, one or more clamps may be attached between plate 110 and plate 150. The clamps are configured to compress fibrous preform 100 between plate 110 and plate 150.

Fibrous preform 100 and plates 110, 150 are then placed in a CVI/CVD furnace for densification. After densification (i.e., once a desired density and/or a desired volume of carbon matrix is achieved), a silicon melt infiltration (SMI) may be performed to fill, or substantially fill, any remaining porosity (e.g., any pores in and/or defined by the matrix material).

In various embodiments, fibrous preform 100 may be fabricated using a net shape molding technology. For example, the textile layers 102 and ceramic particle layers 104 may be laid-up over a mold surface, rather than plate 110. During the lay-up process, the textile layers 102 of fibrous preform 100 conform to the shape of the mold surface. In various embodiments, the ceramic particle layers 104 may include a mixture of silicon carbide powder and phenolic resin powder. The phenolic resin powder may form, for example, between 5% and 10%, between 0.5% and 5%, or less than 2%, by weight percentage, of the total silicon-carbide-phenolic-resin powder mixture. Once the desired number of textile layers 102 and ceramic particle layers 104 have been stacked over the mold surface, the fibrous preform is cured. For example, the fibrous preform may be heated at a temperature of between 170° C. (338° F.) and 230° C. (446° F.), or about 200° C. (392° F.) for between 1 and 10 hours. It will be appreciated that the cure temperature and time may be selected based on the particular type and volume of phenolic resin powder. Fabricating the fibrous preform using net shape molding technology may decrease manufacturing time and/or material waste, as the need to machine the part may be eliminated or reduced. After curing, the fibrous preform 100 is densified and a SMI is performed.

Figure 5A:
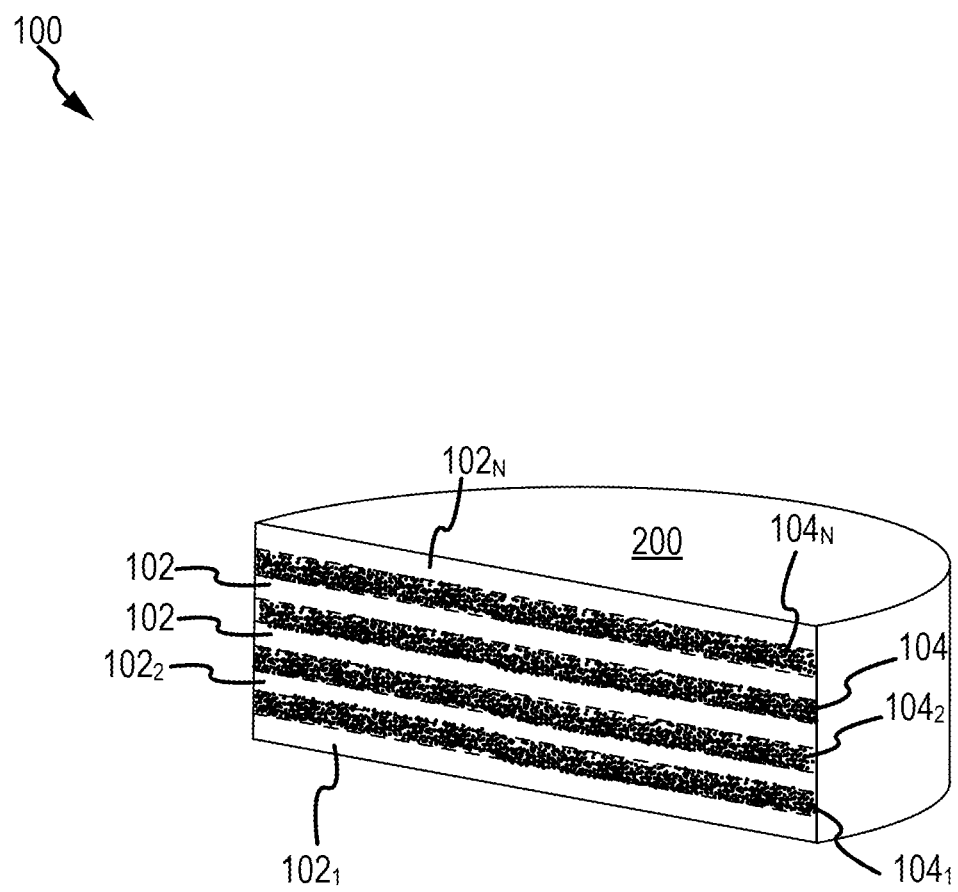
FIG. 5A illustrates a cross-section view of a fibrous preform after densification and silicon melt infiltration, in accordance with various embodiments.

FIG. 5A shows a cross-section view of fibrous preform 100 after densification and SMI. After densification and SMI, fibrous preform 100 forms a fiber-reinforced composite component 200. Stated differently, the densified and silicon infiltrated fibrous preform is a fiber-reinforced composite component. The porosity, or open space, between the carbon fibers of textile layers 102 and between the silicon carbide particles of ceramic particle layers 104 is filled or substantially filled with carbon matrix (e.g., see matrix material 212 of FIG. 5B). It is contemplated and understood that silicon carbide particles may infiltrate and be located within the textile layers 102.

Figure 5B:
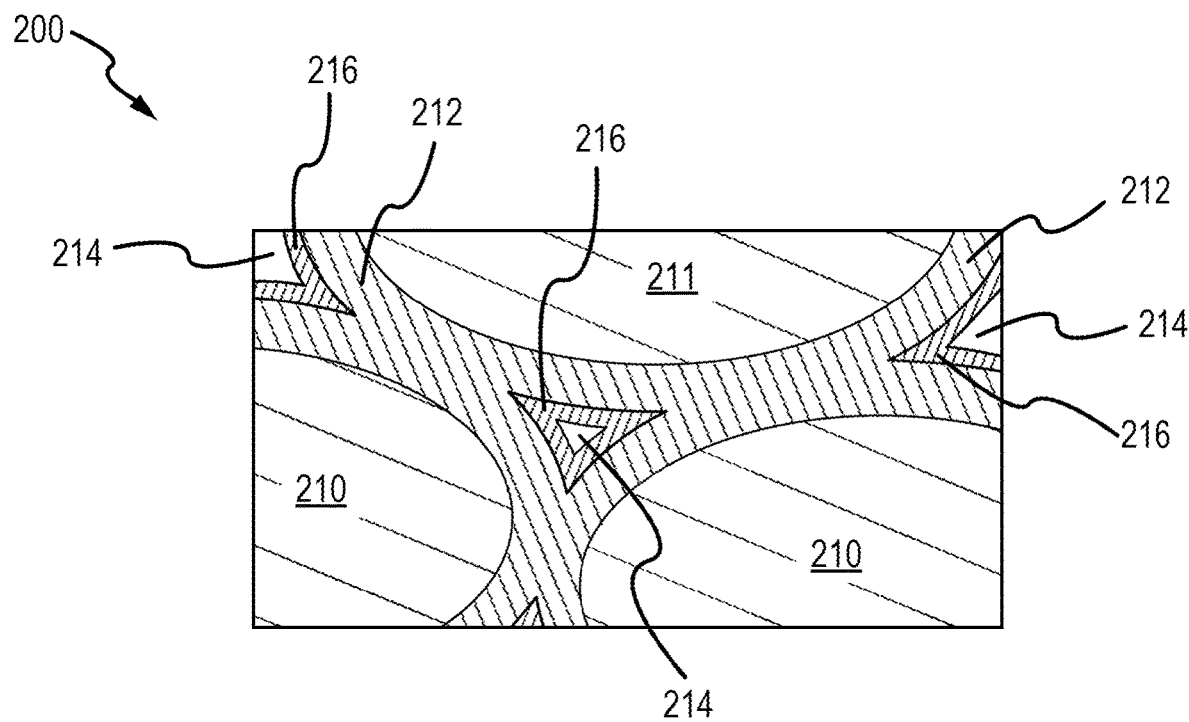
FIG. 5B illustrates a magnified view of a portion of the fibrous preform of FIG. 5A during the silicon melt infiltration process, in accordance with various embodiments.

With reference to FIG. 5B, a magnified view of a portion of fiber-reinforced composite component 200 (i.e., fibrous preform 100 after densification and during SMI) is illustrated. Silicon carbide particles 210 and carbon fibers 211 are coated and/or encapsulated with matrix material (e.g., carbon) 212. Stated differently, matrix material 212 is located in the porosity (i.e., open volume) between adjacent silicon carbide particles 210, between adjacent carbon fibers 211, and between adjacent silicon carbide particles 210 and carbon fibers 211. Matrix material 212 may be carbon material deposited during the CVI/CVD process. During SMI, silicon 214 infiltrates the porosity (i.e., open volume) in the matrix material 212. A layer of silicon carbide 216 may be formed at the interface between the silicon 214 and the carbon of matrix material 212. In this regard, the silicon carbide 216 may surround and/or encapsulate the matrix material 212. The silicon 214 and silicon carbide 216 coating over the matrix material 212 and the silicon carbide particles 210 tends to protect the matrix material 212 and the silicon carbide particles 210 from oxidation at elevated temperatures.

Figure 5C:
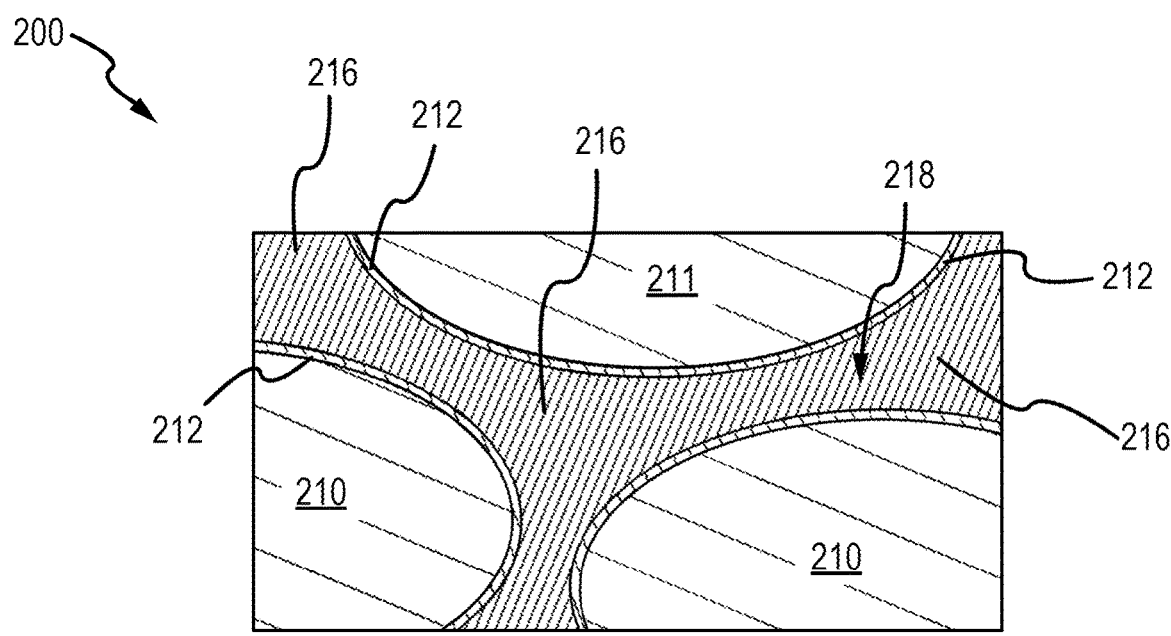
FIG. 5C illustrates a magnified view of a portion of the fibrous preform of FIG. 5A after the silicon melt infiltration process, in accordance with various embodiments.
Figure 5D:
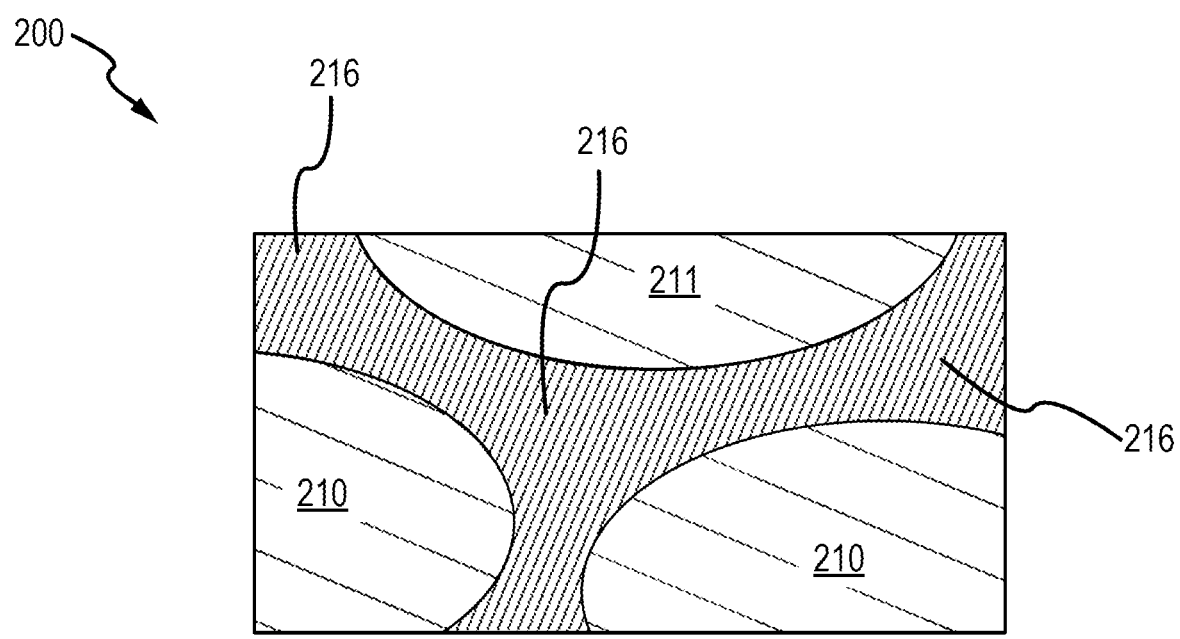
FIG. 5D illustrates a magnified view of a portion of the fibrous preform of FIG. 5A after the silicon melt infiltration process, in accordance with various embodiments.

With reference to FIG. 5C, the SMI process may continue until most or all the silicon 214 is converted into silicon carbide 216. In various embodiments, at the end of the SMI process a thin layer of matrix material 212 may be located surrounding the carbon fibers 211 and disposed between the carbon fibers 211 and the silicon carbide 216. In various embodiments, at the end of the SMI process all of the matrix material 212 may be converted into silicon carbide 216 (see FIG. 5D). For example, between 50% and 100%, between 75% and 100%, between 85% and 100%, between 80% and 99%, or between 80% and 95% of the matrix material 212 may be converted from the CVI/CVD carbon material into silicon carbide 216, in accordance with various embodiments.

In various embodiments, the number of moles of silicon 214 may be tailored to achieve the desired ratio of silicon carbide 216 and matrix material 212. For example, if it is desired to convert between 85% and 100% of the matrix material 212 into silicon carbide 216, then the number of moles of silicon 214 may be selected to be between 85% and 100% of the number of moles of matrix material 212. In various embodiments, the number of moles of silicon 214 may be selected to be between 50% and 100%, between 75% and 100%, between 85% and 100%, between 80% and 99%, or between 80% and 95% of the number of moles of matrix material 212. In this manner, the quantity of silicon 214 may be tailored to achieve a desired quantity of silicon carbide 216 or matrix material 212, while maintaining the carbon fibers 211 (i.e., without converting carbon in the carbon fibers 211 into silicon carbide).

In various embodiments, after densification and prior to SMI, fibrous preform 100 may have an open porosity of less than 15%, less than 10%, or less than 8%. In the regard, the open volume defined by the matrix material 212 may form less than 15%, less than 10%, or less than 8% of the total volume of densified fibrous preform 100. In various embodiments, after SMI, fiber-reinforced composite component 200 may have an open porosity of less than 2% or less than 1%. In this regard, the pores, or open volume, of fiber-reinforced composite component 200 may form less than 2% or less than 1% of the total volume of fiber-reinforced composite component 200. In various embodiments, the silicon material (e.g., the silicon 214 and/or the silicon in the silicon carbide 216) may form less than 10%, less than 8%, or less than 6% of a total mass of fiber-reinforced composite component 200.

In various embodiments, the silicon carbide 216 may form between 1% and 20%, between 5% and 20%, or between 8% and 20% of a total mass of fiber-reinforced composite component 200. Maximizing the silicon carbide (SiC) material is associated with an increased oxidation resistance of fiber-reinforced composite component 200, relative to C/C alone. In this regard, the oxidation resistance of fiber-reinforced composite component 200 may be tailored by increasing the volume of silicon carbide and/or decreasing the volume of silicon. In various embodiments, fiber-reinforced composite component 200 may include, by weight percentage, between 10% and 80% silicon carbide, between 20% and 60% silicon carbide, and/or between 50% and 60% silicon carbide. Fiber-reinforced composite component 200 may exhibit similar properties (e.g., strength, ductility, reduced crack propagation, etc.) to C/C alone, but with an increased oxidation resistance. Stated differently, fiber-reinforced composite component 200 is a CMC material having a greater oxidation resistance than C/C, while exhibiting the other properties of C/C.

Figure 6A:
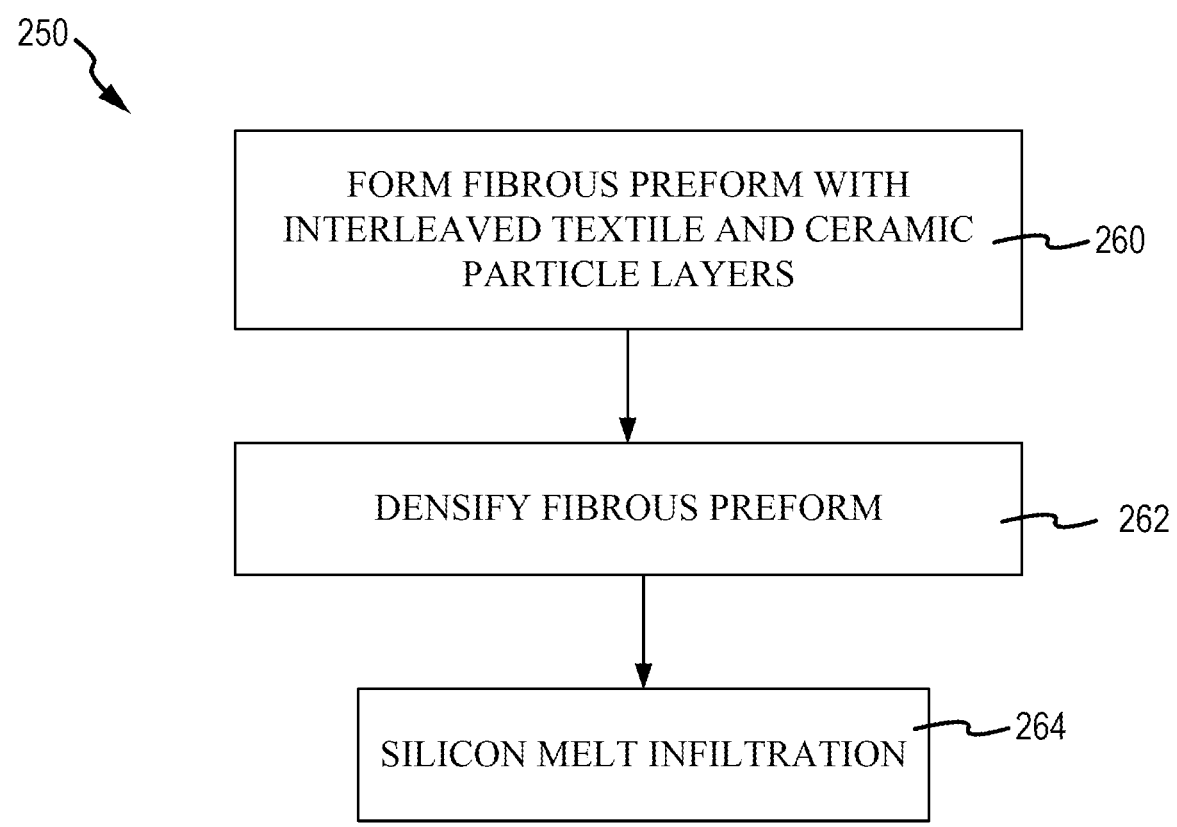
FIG. 6A and FIG. 6B illustrate a method of forming a fibrous preform and a composite component, in accordance with various embodiments.

With reference to FIG. 6A, a method 250 of fabricating a composite component is illustrated. In accordance with various embodiments, method 250 may include forming a fibrous preform (step 260), densifying the fibrous preform (step 262), and performing a silicon melt infiltration (step 264).

Figure 6B:
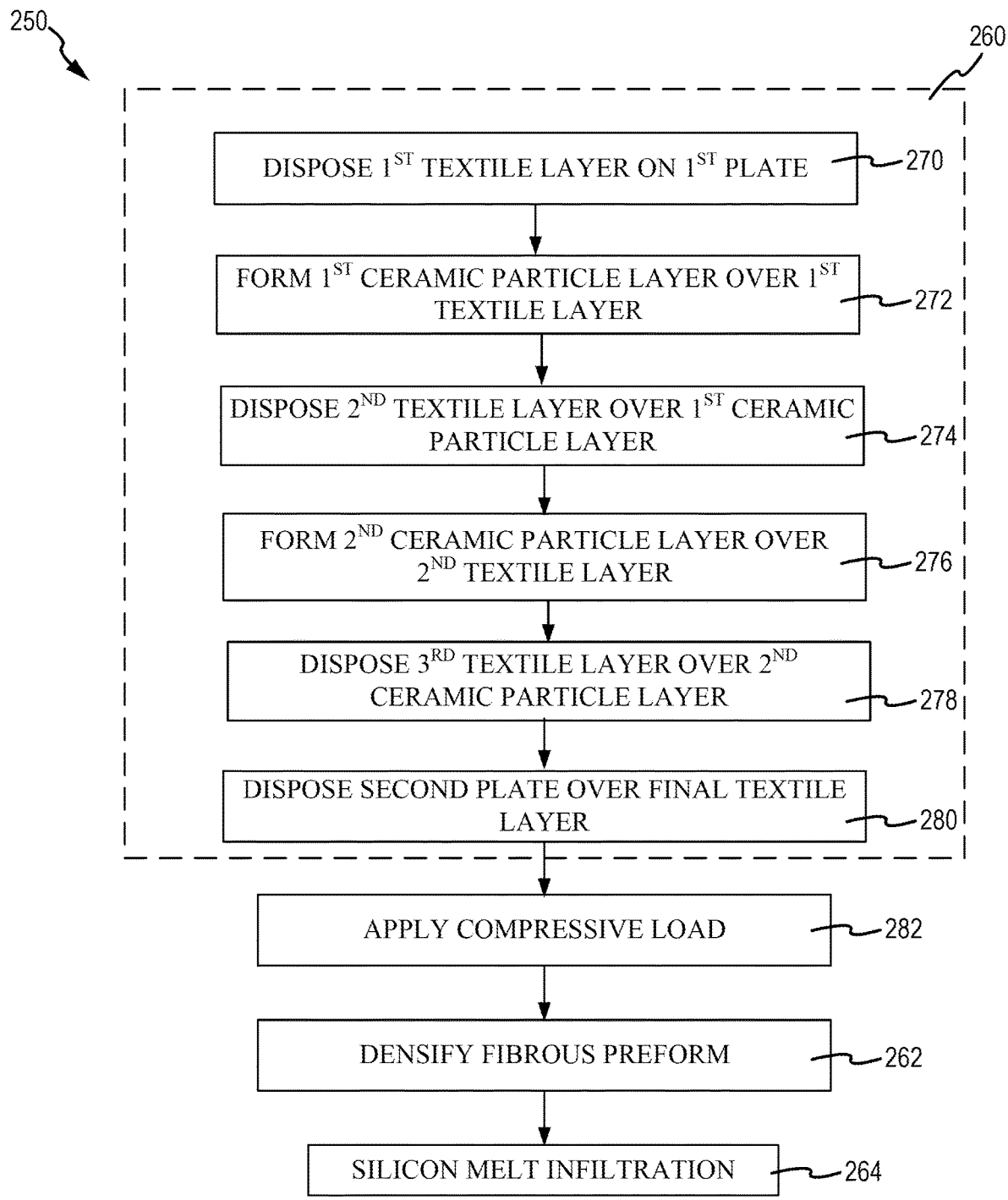

With reference to FIG. 6B, step 260 of method 250 may include disposing a first textile layer on first plate (step 270), forming a first ceramic particle layer over a first textile layer (step 272) disposing a second textile layer over the first ceramic particle layer (step 274), forming a second ceramic particle layer over the second textile layer (step 276), and disposing a third textile layer over the second ceramic particle layer (step 278). Once a desired number of textile layers and ceramic particle layers have been stacked, a second plate is located over the final textile layer (step 280). In various embodiments, a compressive load may be applied to the fibrous preform (step 282). In various embodiments, the compressive load may be applied during the densification step (i.e., step 262).

In various embodiments, step 262 includes densifying the fibrous preform by CVI and/or CVD.

In various embodiments, the SMI process at step 264 may include wetting the exposed surfaces of the matrix material 212 with silicon 214. The silicon 214 may be heated—e.g., by placing the fibrous preform into a furnace—to a temperature (also referred to herein as a melt temperature) at which the silicon begins to melt. The melt temperature may be between 1410° C. (2570° F.) and 1500° C. (2732° F.), or between 1410° C. (2570° F.) and 1450° C. (2642° F.), or between 1415° C. (2579° F.) and 1450° C. (2642° F.). The silicon 214 may be heated to the melt temperature until a desired percentage of the matrix material 212 and the silicon 214 is combined to form silicon carbide 216, for example until between 50% and 100%, between 75% and 100%, between 85% and 100%, between 80% and 99%, or between 80% and 95% of the matrix material 212 is converted from the CVI/CVD carbon material into silicon carbide 216.

In various embodiments, between 50% and 100%, between 75% and 100%, between 85% and 100%, between 80% and 99%, or between 80% and 95% of the pore volume 218 (i.e., the volume between silicon carbide particles 210 and/or carbon fibers 211) is filled with silicon carbide 216. In various embodiments, between 0% and 25%, between 0% and 10%, between 1% and 25%, between 1% and 10%, or between 1% and 5% of the pore volume 218 (i.e., the volume between silicon carbide particles 210 and/or carbon fibers 211) is filled with matrix material 212.

In various embodiments, the fibrous preform may be machined between step 262 and step 264. The machining process may be performed to open up pores located at or near the periphery of the fibrous preform to aid the silicon melt infiltration process at step 264. The machining process may be performed to achieve a desired final shape and/or size. Machining may include grinding, milling, sanding, cutting, or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of fabricating a composite component, comprising:
    forming a fibrous preform by:
        forming a first ceramic particle layer over a first textile layer by depositing a mixture of silicon carbide powder and phenolic resin powder over the first textile layer;
        disposing a second textile layer over the first ceramic particle layer;
        forming a second ceramic particle layer over the second textile layer; and
        disposing a third textile layer over the second ceramic particle layer;
    performing a densification process on the fibrous preform, the densification process including coating a plurality of fibers of the fibrous preform with a carbon matrix material; and
    performing a silicon melt infiltration process after the densification process, the silicon melt infiltration process including:
        infiltrating a plurality of pores defined by the carbon matrix material with a silicon material, and
        heating the fibrous preform to a melt temperature until at least 50% of the carbon matrix material and at least a portion of the silicon material are converted into silicon carbide.

2. The method of claim 1, wherein the densification process further includes applying a compressive load to the fibrous preform.

3. The method of claim 1, wherein the plurality of fibers are carbon fibers.

4. The method of claim 1, wherein forming the second ceramic particle layer comprises depositing a second volume of silicon carbide powder over the second textile layer.

5. The method of claim 4, wherein forming the fibrous preform further comprises:
    locating a first shim around an outer perimeter of the first textile layer;
    forming the first ceramic particle layer over the first textile layer by depositing the mixture of silicon carbide powder and phenolic resin powder over the first textile layer up to at least an upper surface of the first shim;
    locating a second shim around an outer perimeter of the second textile layer;
    removing the first shim prior to densification; and
    removing the second shim prior to densification.

6. The method of claim 5, wherein forming the fibrous preform further comprises:
    removing a portion of the first volume of silicon carbide powder extending beyond an upper surface of the first shim; and
    removing a portion of the second volume of silicon carbide powder extending beyond an upper surface of the second shim.

7. The method of claim 4, wherein forming the fibrous preform further comprises:
    disposing the first textile layer on a first plate; and
    disposing a second plate over the third textile layer;
    wherein at least one of the first plate or the second plate includes at least one of a groove or an orifice.

8. A method of forming a fibrous preform for fabricating a composite component, comprising:
    forming a first ceramic particle layer over a first textile layer, the first ceramic particle layer comprising a first volume of silicon carbide powder having an average particle size between 35 micrometers and 163 micrometers, and the first textile layer comprising pre-oxidized stretch-broken carbon fibers,
    disposing a second textile layer over the first ceramic particle layer;
    forming a second ceramic particle layer over the second textile layer;
    disposing a third textile layer over the second ceramic particle layer;
    coating at least one of the first ceramic particle layer, the first textile layer, the second textile layer, the second ceramic particle layer, or the third textile layer with a carbon matrix material;
    infiltrating a plurality of pores defined by the carbon matrix material with a silicon material; and
    heating the composite component to a melt temperature until at least 50% of the carbon matrix material and at least a portion of the silicon material are converted into a silicon carbide.

9. The method of claim 8, wherein the composite component is heated to the melt temperature until at least 75% of the carbon matrix material is converted into the silicon carbide.

10. The method of claim 8, wherein forming the second ceramic particle layer comprises depositing a second volume of silicon carbide powder over the second textile layer.

11. The method of claim 8, further comprising:
    disposing the first textile layer on a mold surface;
    forming the first ceramic particle layer by depositing a mixture of silicon carbide powder and phenolic resin powder over the first textile layer, the phenolic resin powder being less than 2% by weight of the first ceramic particle layer; and
    curing the phenolic resin powder.

12. The method of claim 8, wherein at least one of the second textile layer or the third textile layer comprises stretch-broken carbon fibers.

13. The method of claim 8, wherein a number of moles of the silicon material selected to be between 75% and 100% of a number of moles of the carbon matrix material.

14. The method of claim 8, wherein the melt temperature is between 1410° C. (2570° F.) and 1500° C. (2732° F.).

* * * * *